Figure 1:
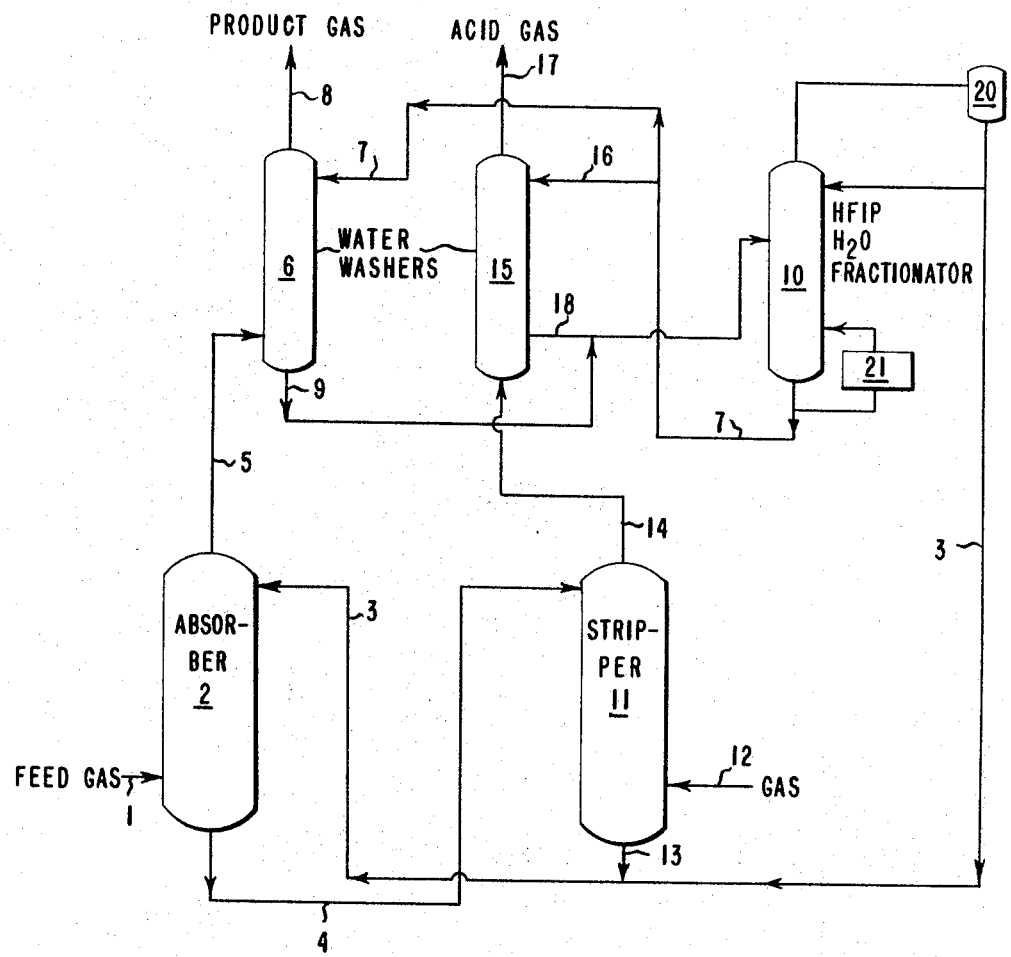

United States Patent Office 3,339,342
Patented Sept. 5, 1967

3,339,342
PROCESS FOR REMOVING $H_2S$ AND $CO_2$ FROM GAS MIXTURES
Robert H. Blaker, Hockessin, and William T. Robinson, Wilmington, Del., assignors to E. I. du Pont de Nemours and Company, Wilmington, Del., a corporation of Delaware
Filed Mar. 15, 1965, Ser. No. 439,893
5 Claims. (Cl. 55—53)

This invention is directed to the separation, by preferential absorption in a solvent, of gaseous hydrogen sulfide and/or carbon dioxide from their mixtures with such gases as methane, carbon monoxide, nitrogen and hydrogen.

The separation and removal of acidic gases like hydrogen sulfide and carbon dioxide from other gas mixtures is an important commercial process. If a gaseous mixture is to be used as fuel, hydrogen sulfide and carbon dioxide reduce its heating value. If the gas mixture is to be used directly as a chemical intermediate or reactant, hydrogen sulfide is particularly objectionable since it is known to poison many reaction catalysts. Carbon dioxide in such reactant gas streams may be objectionable due to its undesired reactivity in the system or because it builds up in concentration in recycle gas streams as an undesired diluent. In other situations, it may be desired to separate and recover hydrogen sulfide or carbon dioxide for any of the many well-known uses of these materials.

Heretofore, several processes have been suggested by which the separation of hydrogen sulfide and/or $CO_2$ from $CH_4$, $H_2$, $N_2$ and CO can be accomplished. Some of these processes are compared in an article by Reisenfeld and Mulowney in "Petroleum Refiner," vol. 38, No. 5, page 161 (May 1959). Some processes are based on absorption of the acidic gases in aqueous caustic solutions. Such processes are convenient for use in petroleum refineries and chemical plants in which the caustic solutions obtained can be further neutralized or otherwise treated for disposal. However, a serious disadvantage to a separation process using caustic solutions is the difficulty encountered in recovering $H_2S$ and $CO_2$ from the caustic solutions. Because of this difficulty, it is usually economically advisable to discard the caustic solutions. Other processes are based on absorption of the acidic gases in aqueous solutions of sodium and/or potassium carbonates or phosphates from which the acidic gas can be removed by heating and/or stripping so that the solution can be regenerated and recycled. Such processes are sometimes made more efficient by addition to the solution of arsenic compounds or other catalysts which increase the rate of gas absorption or change the chemical reactions involved and cause conversion of hydrogen sulfide to other products. Such processes require expensive materials of construction, produce unwanted by-products, and involve the handling of poisonous materials. Still other processes for separating $H_2S$ and $CO_2$ from gaseous mixtures are based on the absorption of the acidic gases in aqueous or anhydrous organic amines or other weak bases from which the acidic gases can be removed by heating. Processes using monoethanolamine and diethanolamine are among the more common of this type. Such processes, however, are disadvantageous since significant power requirements for heating and cooling are involved.

Still another type of process used in the art to effect this separation is one in which an unreactive solvent is employed. For example, N-alkylated pyrrolidones and piperidones are described in U.S.P. 3,120,993 as selective solvents for separating hydrogen sulfide from industrial gases which additionally contain carbon dioxide and hydrocarbons. The use of acetone for removing carbon dioxide from gas mixtures is also described in an article by Stotler in "Hydrocarbon Processing & Petroleum Refiner," vol. 42, No. 10, pages 154 to 156 (1963). The use of tetrahydrothiophene sulfone (sulfolane) along with an alkanol amine for removing hydrogen sulfide and carbon dioxide from gas mixtures is described in an article in the Oil and Gas Journal, Mar. 16, 1964, pages 95–98.

It is, therefore, an object of this invention to provide a new and improved process for the separation of $H_2S$ and/or $CO_2$ from their mixtures with other gases.

It is another object to provide a process of such character which employs a single solvent which is unusually efficient to selectively absorb $H_2S$ and/or $CO_2$ from gas mixtures.

It is a further object to provide a solvent for such a process which is readily separated from $H_2S$ and $CO_2$ and recovered for reuse, and which is safe and economical to use.

These and other objects will become apparent from the following description and claims.

The present invention is directed to a novel process for separating components of a gaseous mixture which comprises (a) Contacting a gaseous mixture containing at least one acid gas, such as hydrogen sulfide and/or carbon dioxide and at least one gas of the group consisting of methane, hydrogen, nitrogen, and/or carbon monoxide with liquid hexafluoroisopropyl alcohol and selectively absorbing in the alcohol the acid gas components, and (b) Separating the liquid solvent phase containing the absorbed acid gas from the other components of the gaseous mixture.

More specifically, the present invention is directed to a process for separating hydrogen sulfide and/or carbon dioxide by selective absorption with hexafluoroisopropyl alcohol from natural gases relatively free of hydrocarbon gases having two or more carbon atoms and synthetic gases obtained by partial oxidation of carbonaceous materials or by reaction of hot carbonaceous materials with air and steam.

That hexafluoroisopropyl alcohol would be a suitable and preferred selective solvent for the process of this invention is unexpected and unpredictable. Alcohols are generally recognized as highly polar compounds having high solubility for many gases and particularly for such polar acidic gases as hydrogen sulfide and carbon dioxide. Fluorohydrocarbons, on the other hand, are recognized generally as non-polar compounds having low solubility for all gases. It was, therefore, quite unexpected that hexafluoroisopropyl alcohol, a fluoroalcohol with an ideal boiling point for this separation, should also have the particular balance of solubility properties which make it a useful and selective solvent in the process of this invention.

The preparation of hexafluoroisopropyl alcohol is fully described in Belgian Patent 634,368/63 and in an article in "Chemical and Engineering News," Nov. 30, 1964, pages 32 and 33. Hexafluoroisopropyl alcohol can be obtained by treatment of hexafluoroacetone with a reducing agent like lithium hydride or sodium borohydride in a suitable solvent or by hydrogenation of hexafluoroacetone over a catalyst like platinum. The resulting alcohol, which has the structure $CF_3CH(OH)CF_3$ and can also be called hexafluoroisopropanol, 2-H-hexafluoro-2-propanol, or 1,1,1,3,3,3-hexafluoropropanol-2, is a water-white liquid which boils at 59° C. at 760 mm., melts at −1° C., and has a refractive index of below 1.3 at 20° C., a calculated critical temperature of 182° C., and a calculated heat of vaporization of about 90 B.t.u. per pound. It is miscible with water in all proportions and yet is easily separated from water by distillation.

Several other properties also make hexafluoroisopropyl alcohol a particularly attractive solvent for use in the process of this invention. It can be operated with relatively simple equipment and with small requirements for power in the form of heating and cooling. Operating conditions can be varied over wide ranges to achieve a practical balance between the various process factors which make for separation efficiency and low cost. The solvent is easily recovered by water washing and is easily separated from water for recycle. The solvent is also stable, non-reactive, and non-corrosive to common materials of construction, and insensitive to trace components in the mixtures to be separated. Any solvent which is not removed from the process gases will be harmless in most subsequent uses of the gases.

The gas mixtures from which hydrogen sulfide and/or carbon dioxide can be separated by the process of this invention can be of natural or synthetic origin. Those natural gases sometimes referred to as "dry" gases (because they contain no easily condensable hydrocarbons) are gas mixtures from which the acid gases $H_2S$ and $CO_2$ can be removed by the process of this invention. Some of these gases contain sufficient carbon dioxide that removal of $CO_2$ is economically worthwhile if the gas is to be used as a fuel. Other natural gases of this type sometimes contain sufficient hydrogen sulfide to make them unattractive as fuels unless the hydrogen sulfide is removed. Similar gas mixtures are sometimes obtained as by-products of the refining of petroleum and their treatment by the process of this invention is attractive before they are mixed with natural or synthetic gas for sale as fuel.

The synthetic gas mixtures which may be treated by the process of this invention are of the types known as city gas, producer gas, water gas, blue gas, and also by other names well known in the industry. City gas is usually obtained by the retorting of coal. Producer gas is made by partial oxidation of coal or coke. Water gas and blue gas are obtained in similar processes in which water is passed over hot carbonaceous materials to produce mixtures of hydrogen, carbon dioxide, and carbon monoxide. Similar processes yielding similar gas mixtures can be operated with residual fuel oils and other petroleum products as the raw material instead of coal or coke.

Other gas mixtures which may be treated by the process of this invention to remove hydrogen sulfide and/or carbon dioxide include the synthetic gas mixtures especially prepared for use as reactants in the production of chemicals. Gases of this type include mixtures of nitrogen and hydrogen (commonly called synthesis gas) which are used in the production of ammonia. Mixtures of carbon monoxide and hydrogen are used as an intermediate in the production of liquid fuels from coals and other carbonaceous fuels. Carbon monoxide is used in the production of aldehydes and alcohols from olefins by the "oxo" reaction. Hydrogen is also used in a number of chemical syntheses. Such mixtures are usually made by the partial oxidation of hydrocarbon or carbonaceous fuels, frequently in conjunction with the so-called water gas shift reaction.

In general, the process is conducted by contacting the gaseous mixture containing $H_2S$ and $CO_2$ with liquid hexafluoroisopropyl alcohol under such conditions of temperature and pressure as will maintain the hexafluoroisopropyl alcohol in the liquid state and the gaseous mixture in the gaseous state. The contacting may be accomplished by any conventional procedure for obtaining efficient contact of a gas with a liquid, such as agitation in a vessel, passing the gaseous mixture and the liquid through a mixing tube, passing the gaseous mixture through a body of the liquid, countercurrent flow of gas and liquid and the like. Due to the high solvency power of hexafluoroisopropyl alcohol for acid gases such as $H_2S$ and $CO_2$, there will be obtained a liquid solvent phase of hexafluoroisopropyl alcohol having absorbed therein the acid gases or a gaseous mixture highly enriched in acid gas concentration, and a gaseous phase composed of or enriched in the other components in the original gas mixture, such as $H_2$, $N_2$, $CH_4$, and CO. The liquid solvent phase will normally be treated to remove the hexafluoroisopropyl alcohol therefrom and to recover the absorbed acid gas. Also, when the gaseous phase contains entrained or vaporized hexafluoroisopropyl alcohol, it can be similarly treated if desired to remove and recover the alcohol.

A representative system and arrangement of apparatus, which is suitable for use in the practice of this invention, is shown schematically in FIGURE 1 in the accompanying drawing. FIGURE 1 is merely illustrative of one possible arrangement of apparatus for treating gaseous mixtures in accordance with the present invention and is in no manner meant to be a limitation of the present invention.

In FIGURE 1, a feed gas mixture containing an acid gas such as $H_2S$ and/or $CO_2$ and another gas containing $H_2$, $N_2$, $CH_4$, and/or CO is introduced through line 1 into absorber 2 in which it is contacted with a stream of liquid hexafluoroisopropyl alcohol introduced to the absorber 2 through line 3. After suitable contacting in absorber 2 to provide absorption of the $H_2S$ and/or $CO_2$ from the gas mixture by the solvent, the unabsorbed or purified gas stream is taken from the top of the absorber 2 and introduced by line 5 into a water scrubber 6. In the water scrubber 6 the purified gas is washed with a water stream entering the scrubber through line 7 to obtain a solvent-free, purified product gas stream flowing in line 8 and a mixture of solvent and water which is carried by lines 9 and 18 to a hexafluoroisopropyl alcohol-water fractionator 10. From the top of the fractionator 10 the alcohol vapor passes through condenser 20. The liquid alcohol from condenser 20 is split into two streams. One stream is recycled to the top of the fractionator 10 while the other stream of liquid alcohol from the condenser 20 is returned by line 3 to the absorber 2. The water taken from the bottom of the fractionator 10 is also split into two streams. One water stream is recycled through a reboiler 21 to the fractionating column 10. The other stream is recycled through lines 7 and 16 to the top of the water scrubbers 6 and 15.

The mixture of solvent and absorbed gases from the bottom of the absorber 2 is passed through line 4 to the top of the stripper 11 where it is contacted with stripping gas 12. From the stripper 11, the stripped solvent stream 13 is combined with the solvent stream 3 and recycled to the absorber 2. The stripping gas laden with entrained solvent is passed from the stripper 11 via line 14 into water scrubber 15. The stripping gas is washed in the scrubber with water from line 16 to obtain a solvent-free mixture of absorbed gases and stripping gas which are carried from the scrubber through line 17 to whatever end use is desired. The mixture 18 of solvent and water is combined with stream 9 for separation in the fractionator 10. This simplified flow sheet and process description omits many incidental operations and items of auxiliary equipment such as heat exchangers, gas driers, pumps, pressure regulating devices, etc., the need for which will be obvious to one skilled in the design and operation of such apparatus.

Many variations of the process are possible and will be apparent to one skilled in the operation of processes for removing $H_2S$ and $CO_2$ from gas mixtures. For instance, temperature and pressure are not critical and the process can be operated throughout a wide range of temperatures and pressures depending on the separation desired and equipment used. The temperature and pressure throughout the process should be balanced, however, to maintain the solvent and gas in the desired liquid and gaseous states and to obtain a useful balance of separation efficiency, gas solubility, and plant and operating costs. High pressures will reduce gas volumes and promote high solubility but may reduce separation efficiency enough to require more complex absorption equipment. Low temperatures will reduce gas volumes and reduce the vapor pressure of the solvent and also will increase the solubilities of the gases in the solvent. Thus, the optimum balance of temperature and pressure for the desired absorption will be chosen to suit the mixture being separated, the pressures at which it is available and at which the purified gas is desired, the equipment used, and other such considerations. It is generally preferred to operate the process at pressures above 50 p.s.i.g. at ambient temperatures.

Similarly, the temperatures and pressures at which the dissolved gases are desorbed from the selective solvent and at which the gas streams are freed of the solvent may be adjusted over a wide range to accommodate the process conditions and equipment at hand. The desorption pressure will usually be lower than the absorption pressure to take advantage of the lower solubilities of the gases at lower pressures. Likewise, the desorption temperature may be higher than the absorption temperature in order to decrease the solubility of the gas in the solvent, but should not be high enough to raise unduly the vapor pressure of the solvent.

Various types of equipment constructed of varying materials can be used for absorption and desorption of the gases dissolved in the solvent. Packed columns, absorbers containing plates and trays of different designs, spray towers, and various other types of gas-liquid contacting equipment are suitable. The detailed design of this equipment will depend on the volumes of gases and liquids to be handled and on the efficiency of separation desired.

Representative examples illustrating the present invention follow. All parts are by weight unless otherwise specified.

*Example 1*

Figure 2:
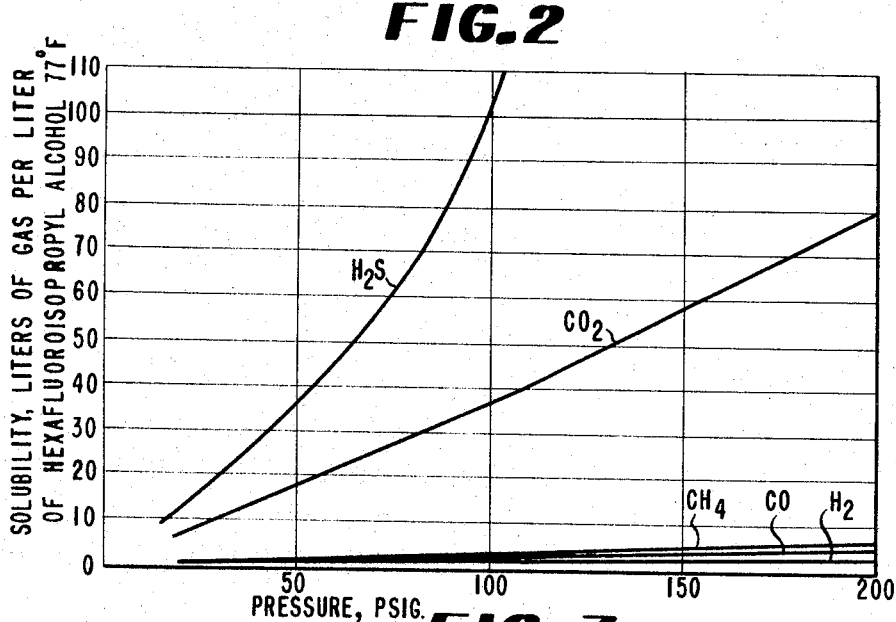

A 300 ml. stirred pressure autoclave was evacuated at 25° C. and 50 ml. of hexafluoroisopropyl alcohol were introduced into the autoclave by suction. The remainder of the vacuum was released with carbon monoxide and additional carbon monoxide was added to bring the pressure to 50 p.s.i.g. The contents of the autoclave were stirred for 10 minutes at this pressure to assure equilibrium. The stirrer was stopped and the liquid layer was withdrawn through a bottom outlet into an atmospheric pressure surge vessel connected to a water-filled wet test meter. The volume of liquid collected and the volume of gas evolved were determined and the solubility of the gas in the alcohol was calculated. The solubility of the gas in both the water and alcohol at atmospheric temperature was assumed to be negligible and, therefore, not accounted for in the calculations. This procedure was repeated with carbon monoxide at pressures of 100 and 150 p.s.i.g. and with hydrogen, hydrogen sulfide, carbon dioxide, and methane at 50, 100, and 150 p.s.i.g. The calculated solubilities of the gases in the alcohol at the various pressures are given in Table I. To show the marked differences of the solubilities of these gases in hexafluoroisopropyl alcohol, these results are graphically illustrated in FIGURE 2.

This example shows that hydrogen sulfide and carbon dioxide are more soluble in hexafluoroisopropyl alcohol than hydrogen, carbon dioxide, and methane and illustrates the separation of the gases by selective absorption in the alcohol.

TABLE I.—SOLUBILITIES OF GASES IN HEXAFLUOROISOPROPYL ALCOHOL

| Gas | Liters of gas per liter of hexafluoroisopropyl alcohol | | |
|---|---|---|---|
| | 50 p.s.i.g. | 100 p.s.i.g. | 150 p.s.i.g. |
| $CO_2$ | 17.3 | 36.9 | 58.1 |
| $H_2S$ | 35.4 | 103.6 | 210.0 |
| $H_2$ | 1.7 | 1.9 | 2.4 |
| $CH_4$ | 2.6 | 4.2 | 6.0 |
| CO | 2.2 | 3.5 | 4.5 |

*Example 2*

The methods and procedures described in "Gas Chromatography" by A. I. M. Keulmans (pages 170–174 and 182–190 of the second (1959) edition, published by Reinhold Publishing Co., New York) were used to determine the Henry's Law solubility constant at infinite dilution in hexafluoroisopropyl alcohol of each of the gases listed in Table II. This technique depends on the fact that small samples of gases injected into a chromatographic column pass through the column at a rate inversely proportional to their solubility in a solvent dispersed on an inert solid substrate in the column.

The chromatographic column used in this work was filled with "Gas Chrom" Z (a calcined diatomaceous earth specially treated to reduce the permanent absorption of gases in gas chromatographic analysis obtained from the Applied Science Laboratories, State College, Pa.) and wet with hexafluoroisopropyl alcohol. Small samples of the test gases were passed through the column with a sweep stream of helium and the times of passage were determined by a suitable technique. The data obtained are shown in Table II in terms of the Henry's Law constant.

TABLE II.—HENRY'S LAW CONSTANTS OF GASES DISSOLVED IN HEXAFLUOROISOPROPYL ALCOHOL

| Gas | Henry's Law Constant | |
|---|---|---|
| | 25° C. | 50° C. |
| Methane | >400,000 | |
| Nitrogen | >400,000 | |
| Hydrogen | >400,000 | |
| Carbon monoxide | >400,000 | |
| Carbon dioxide | 45,500 | |
| Hydrogen sulfide | 15,200 | 15,800 |

The Henry's Law solubility constants are recognized as indicating the ease of separation of gases by selective absorption in the solvent used, the ratio of the solubility constant being the preferred indicators of ease of separation. Using the above figures, the ratio of the Henry's Law constants for hydrogen sulfide or carbon dioxide to such other gases as methane, nitrogen, hydrogen and carbon monoxide indicates the ease with which such gases can be separated.

*Example 3*

Figure 3:
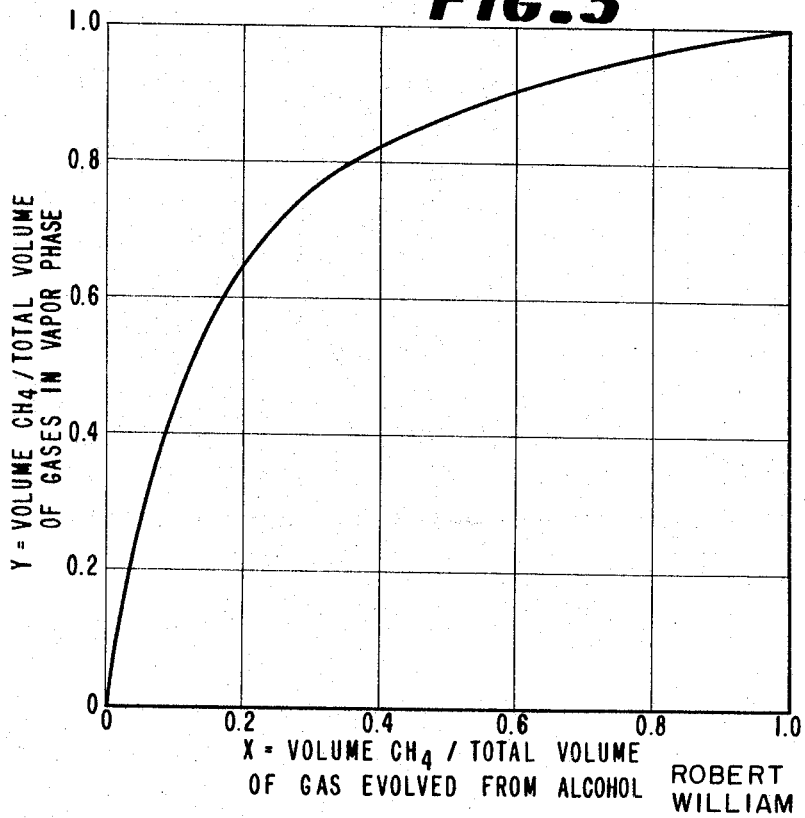

A 300 ml. stirred pressure autoclave was evacuated at 25° C. and 50 ml. of hexafluoroisopropyl alcohol was introduced by suction. Carbon dioxide was added from a cylinder to reach a desired pressure of less than 400 p.s.i.g. Methane was then added from a cylinder to increase the total pressure in the autoclave to 400 p.s.i.g. The mixture was stirred violently for ten minutes. A sample of 2.5 to 8.5 ml. of the liquid layer was bled into 10 ml. of water to degas the solvent almost completely, and a sample of the evolved gas was collected for analysis by well-known Orsat procedures. A sample of the gas phase was scrubbed with water to remove entrained alcohol and analyzed by well-known Orsat procedures. The data obtained from the Orsat procedures are shown in FIGURE 3 as a plot of the volume of $CH_4$ to the total volume of gases evolved from the liquid phase as compared to the volume of $CH_4$ to the total volume of gases from the gas or vapor phase. It must be appreciated that a small amount of $CO_2$ and $CH_4$ gas absorbed in the alcohol would remain absorbed in the alcohol at atmospheric pressure or be absorbed in the water used in degassing the solvent. Similarly, a small amount of $CO_2$ and $CH_4$ in the vapor phase would be absorbed in the water used to scrub the gases of entrained alcohol vapor. These insignificant amounts, tending to offset each other, are not in the results obtained from the Orsat analyses and thus not reflected in the graph of FIGURE 3.

The high volume or mole fraction of methane obtained in the vapor phase and the low volume or mole fraction of methane in the gases evolved from the liquid phase illustrate the effective separation of methane from carbon dioxide by selective absorption in hexafluoroisopropyl alcohol.

*Example 4*

The 300 ml. pressure autoclave of Example 1 was evacuated to pump capacity and then charged with 50 ml. of hexafluoroisopropyl alcohol. In sequence, hydrogen sulfide was introduced to increase the pressure from −10 to +10 p.s.i.g., carbon dioxide was introduced to increase the pressure from +10 to +30 p.s.i.g., carbon monoxide was introduced to increase the pressure from +30 to +55 p.s.i.g., and hydrogen was introduced to increase the pressure from +55 to +75 p.s.i.g. The autoclave was stirred for ten minutes and samples of the vapor and liquid phases were obtained. These samples were analyzed by vapor phase chromatograph. Similar experiments were conducted with total pressures of 150 and 190 p.s.i.g. The compositions of the vapor and liquid phases are given in Table III on an alcohol-free basis.

This example shows the degree of separation obtainable in a single absorption stage. The high ratios of the amounts of carbon dioxide and hydrogen sulfide in the liquid and vapor phase indicate that these gases can be effectively separated from hydrogen and carbon monoxide by a multi-stage or continuous absorption process.

TABLE III.—VAPOR-LIQUID EQUILIBRIUM OF GASES IN HEXAFLUOROISOPROPYL ALCOHOL

| Total Pressure of System, p.s.i.g. | Vapor-Phase Chromatograph Area, Percent of Total | | | | | |
|---|---|---|---|---|---|---|
| | 75 | | 150 | | 190 | |
| | Vapor | Liquid | Vapor | Liquid | Vapor | Liquid |
| Component: | | | | | | |
| CO | 91.7 | 67.5 | 91.7 | 27.5 | 91.2 | 41.7 |
| $H_2$ [1] | 7.3 | 8.8 | 8.3 | 18.9 | 8.8 | 15.8 |
| $CO_2$ | 0.65 | 16.0 | 0.02 | 43.0 | 0.01 | 24.7 |
| $H_2S$ | 0.33 | 7.8 | 0.006 | 10.6 | 0.01 | 17.7 |

[1] Corrected for thermal conductivity differences.

It will be understood that the foregoing drawings and examples are given for illustrative purposes solely and that this invention is not limited to the specific embodiments shown and described therein. On the other hand, it will be readily apparent to those skilled in the art that, subject to the limitations set forth in the general description, many variations and modifications can be made in the gaseous mixtures, the conditions, the procedures, and the apparatus employed without departing from the spirit or the scope of this invention.

As many apparently widely different embodiments of this invention may be made without departing from the spirit and scope thereof, it is to be understood that this invention is not limited to the specific embodiments thereof except as defined in the appended claims.

The embodiments of the invention in which an exclusive property or privilege is claimed are defined as follows:

1. A process for enriching components of a gaseous mixture which comprises the steps of
   (a) contacting a gaseous mixture containing at least one acid gas of the group consisting of hydrogen sulfide and carbon dioxide and at least one gas from the group consisting of methane, hydrogen, nitrogen, and carbon monoxide with liquid hexafluoroisopropyl alcohol and selectively absorbing in said alcohol said acid gas, and
   (b) separating the liquid solvent phase containing the absorbed acid gas from the other components of said gaseous mixture.

2. The process of claim 1 wherein the gaseous mixture is a natural gas relatively free of hydrocarbon gases having 2 or more carbon atoms.

3. The process of claim 1 wherein the gaseous mixture is a synthetic gas produced by the partial oxidation of carbonaceous materials.

4. The process of claim 1 wherein the gaseous mixture is a synthetic gas produced by the reaction of hot carbonaceous materials with air or steam.

5. A process for enriching components of a gaseous mixture which comprises the steps of
   (a) contacting a gaseous mixture containing at least one acid gas of the group consisting of hydrogen sulfide and carbon dioxide and at least one gas from the group consisting of methane, hydrogen, nitrogen, and carbon monoxide with liquid hexafluoroisopropyl alcohol and selectively absorbing in said alcohol said acid gas,
   (b) separating the liquid solvent phase containing the absorbed acid gas from the other components of said gaseous mixture, and
   (c) recovering the absorbed acid gas from the hexafluoroisopropyl alcohol in the liquid solvent phase.

References Cited

UNITED STATES PATENTS 2,863,527  12/1958  Herbert et al. _____ 55—73
3,242,646  3/1966  Miller et al. _____ 55—73 X REUBEN FRIEDMAN, *Primary Examiner.*

D. M. RIESS, *Assistant Examiner.*